United States Patent [19]

Richards et al.

[11] Patent Number: 5,333,138
[45] Date of Patent: Jul. 26, 1994

[54] APPARATUS AND METHOD FOR PREVENTING DATA CORRUPTION IN DISK DRIVES FROM MECHANICAL SHOCK DURING WRITE OPERATIONS

[75] Inventors: John H. Richards; Karl D. Schuh, both of San Jose, Calif.

[73] Assignee: MiniStor Peripherals International Limited, San Jose, Calif.

[21] Appl. No.: 849,740

[22] Filed: Mar. 11, 1992

[51] Int. Cl.⁵ .................. G06F 11/00; G11B 15/04
[52] U.S. Cl. .......................................... 371/7; 371/14; 360/60; 360/75
[58] Field of Search ............... 371/13, 12, 7, 14; 360/75, 77.01, 77.06, 78.01, 60

[56] References Cited

U.S. PATENT DOCUMENTS

| | | |
|---|---|---|
| 4,040,103 | 8/1977 | White .................................. 360/75 |
| 4,692,915 | 9/1987 | Moriya et al. ..................... 369/53 |
| 4,700,244 | 10/1987 | Fasen et al. ........................ 360/77 |
| 4,716,480 | 12/1987 | Wiens et al. ...................... 360/105 |
| 4,725,907 | 2/1988 | Jue ..................................... 360/105 |
| 4,791,508 | 12/1988 | Augeri et al. ..................... 360/99.12 |
| 4,841,389 | 6/1989 | Hoyt et al. ........................ 360/75 |
| 4,862,298 | 8/1989 | Genheimer et al. ............... 360/60 |
| 4,939,611 | 7/1990 | Connolly .......................... 360/128 |
| 4,947,093 | 8/1990 | Dunstan et al. .................. 360/73.04 |
| 4,954,904 | 9/1990 | Goor .................................. 360/75 |
| 4,967,293 | 10/1990 | Aruga et al. ..................... 360/78.12 |
| 4,979,063 | 12/1990 | Ghose et al. ...................... 360/106 |
| 4,996,617 | 2/1991 | Yaeger et al. .................... 360/105 |
| 5,126,895 | 6/1992 | Yasuda et al. .................... 360/77.07 |
| 5,166,842 | 11/1992 | Albert et al. ..................... 360/77.04 |
| 5,168,413 | 12/1992 | Coker et al. ..................... 360/137 |
| 5,193,037 | 3/1993 | Pace .................................. 360/106 |
| 5,227,929 | 7/1993 | Comerford ....................... 360/75 |

FOREIGN PATENT DOCUMENTS

| | | | |
|---|---|---|---|
| 0217460 | 4/1987 | European Pat. Off. ....... G11B 7/09 |
| 0264535 | 4/1988 | European Pat. Off. ....... G11B 5/596 |
| 0385498 | 3/1989 | European Pat. Off. ....... G11B 7/09 |
| 0259127 | 5/1990 | European Pat. Off. ....... G11B 5/54 |
| 0164642 | 11/1990 | European Pat. Off. ....... G11B 7/09 |
| 1155558 | 12/1987 | Japan .............................. G11B 20/10 |
| 1229454 | 3/1988 | Japan .............................. G11B 19/02 |
| 2297702 | 5/1989 | Japan .............................. G11B 5/012 |
| 3238663 | 2/1990 | Japan .............................. G11B 19/02 |

OTHER PUBLICATIONS

Robert G. Kaseta 'Rigid Disk Drive Data Reliability in Harsh Environment' 1991 IEEE pp. 286–289.
Japan Pat. Abs. 85-035377, JP 60-35377, Feb. 23, 1985, Nakashiro, "Magnetic Recording and Reproducing Device."
Japan Pat. Abs. 85-121578, JP 60-121578, Jun. 29, 1985, Moriya et al., "Tracking Controller."
Japan Pat. Abs. 85-164935, JP 60-164935, Aug. 28, 1985, Masaharu et al., "Optical Disc Recording and Reproducing Device."

Primary Examiner—Robert W. Beausoliel, Jr.
Assistant Examiner—Albert Decady
Attorney, Agent, or Firm—D'Alessandro, Frazzini & Ritchie

[57] ABSTRACT

Apparatus for preventing data corruption on a disk due to mechanical shock occurring during the write process to the disk includes a mechanical shock sensor to sense mechanical shocks having a magnitude exceeding a predetermined threshold. Write disable circuitry responsive to the mechanical shock sensor interrupts the write current to the disk drive write head. Repositioning circuitry then repositions the data head over the original data track and the incomplete data that was interrupted by the mechanical shock is rewritten. A method for preventing data corruption on a disk due to mechanical shock experienced by a disk drive during the write process to the disk includes the steps of sensing a mechanical shock having a magnitude exceeding a predetermined threshold; storing information identifying the data being written at the onset of the sensed shock; interrupting the write current to the write head; repositioning the data head to the original track; and rewriting the data which was interrupted because of the sensed shock.

10 Claims, 2 Drawing Sheets

APPARATUS AND METHOD FOR PREVENTING DATA CORRUPTION IN DISK DRIVES FROM MECHANICAL SHOCK DURING WRITE OPERATIONS

BACKGROUND OF THE INVENTION

1. Field Of The Invention

The present invention relates to computers and to disk drive storage systems for computers. More particularly, the present invention relates to apparatus and methods for preventing data corruption on a disk resulting from mechanical shock experienced by the disk drive during the write process to the disk.

2. The Prior Art

Historically, disk drives started as very large immovable devices, weighing over 2000 pounds, and having disk diameters ranging from 2 to 4 feet. Disk sizes quickly evolved to 14 inches and smaller. As development continues, disk drives are continually shrinking in size to accommodate new applications. As disk diameters become smaller, the issue of damage from mechanical shock begins to become a significant factor. As continuing evolution shrinks disk diameters below two inches, mechanical shock becomes a major concern for the first time.

The present concern over the issue of potential damage from mechanical shock results from the development of the small disk drives which are designed to reside in small "laptop" and "notebook" portable computers. Larger disk drives (i.e., 5.25 inch and 3.5 inch) are generally mounted into larger computer systems housed in larger cases, usually residing on desk tops, or in even larger "tower" cases which are placed on the floor. In these environments, the 5.25 inch and 3.5 inch drives are quite safe from damage due to accidental mechanical shocks.

The smaller 2.5 inch drives are employed in lap-top computers, an environment in which they are much more likely to be bumped and jostled. A lap-top computer system weighs from about 5 to 15 pounds. This weight helps lower the peak g-force experienced by the hard disk drive inside the lap-top computer when it is subjected to most mechanical shocks which can be anticipated to occur in its operating environment.

A major market which appears to be developing for the 1.8 inch drives is the palm-top computer. The palm-top computers will be very small and will probably weigh only about 1 to 2 pounds, and can be moved very quickly compared to the lap-top units. Also, palm-top computers are more susceptible to being accidentally bumped, jarred, or even dropped during operation. Because of their low weight, the small disk drive in a palm-top computer can be subjected to a substantial amount of mechanical shock during normal operation of the computer.

There are some effects of mechanical shock which are unpreventable. The worst-case preventable condition, resulting from mechanical shocks, occurs when the drive is writing data to a disk. In this state, the head is positioned over the proper track to record the data. If the mechanical shock is severe enough to cause the head to move over an adjacent data track before the write current in the data head is turned off, the data in the adjacent track will be corrupted. This damaged data is not recoverable. Neither the computer nor disk drive controller know what data was damaged, when and how it was originally generated, and has no way to fix the damaged data. The user will not even know that the data has been corrupted until a read failure is experienced at some later time. It will be too late to reconstruct the corrupted data unless it has previously been backed up.

BRIEF DESCRIPTION OF THE INVENTION

According to a first aspect of the present invention, apparatus is provided for preventing data corruption on a disk due to mechanical shock experienced by the disk drive during the write process to the disk. Mechanical shock sensing means are provided to sense mechanical shocks having a magnitude exceeding a predetermined threshold. If an above-threshold mechanical shock is sensed during a disk write operation, write disable means responsive to the mechanical shock sensing means is activated and interrupts the write current to the disk drive write head. Because the mechanical shock is sensed and the write current is turned off before the write head moves off track, the corruption of data on adjacent tracks is avoided. Recovery means are provided to reposition the head to the original data track and rewrite the incompletely written data that was interrupted by the mechanical shock. Thus, the mechanical shock causes only a minor delay to the user, but prevents corruption of the data on adjacent tracks by write head misalignment caused by the mechanical shock.

A method according to the present invention for preventing data corruption on a disk due to mechanical shock experienced by the disk drive during the write process to the disk includes the steps of sensing a mechanical shock having a magnitude exceeding a predetermined threshold; interrupting the write current to the write head during the duration of the sensed mechanical shock; storing information identifying the data being written at the onset of the sensed mechanical shock; repositioning the head to the original data track; and rewriting the data which was interrupted because of the sensed mechanical shock.

BRIEF DESCRIPTION OF THE DRAWINGS

FIG. 2b is a top view diagram of the single-beam cantilever beam rotational accelerometer of FIG. 2a.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
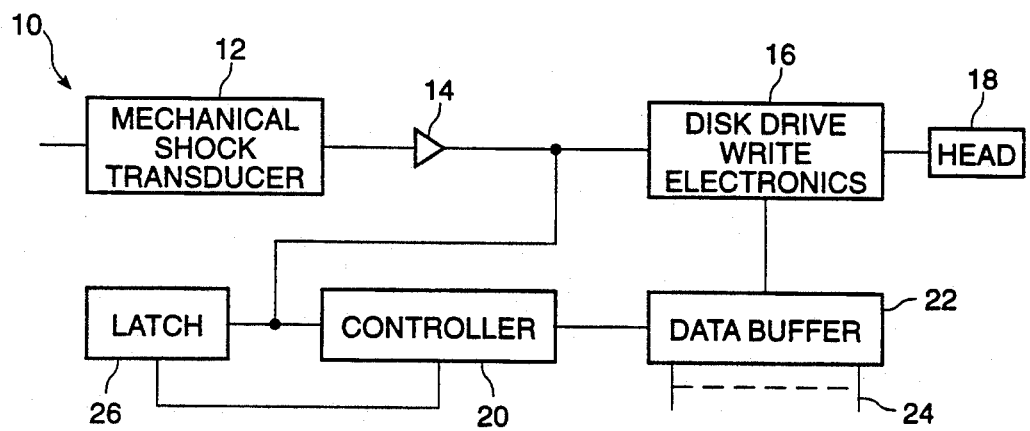
FIG. 1 is a block diagram of an apparatus for preventing data corruption on a disk due to mechanical shock experienced by the disk drive during the writing of data to a selected data track on the disk according to a presently preferred embodiment of the invention.

Referring first to FIG. 1, an apparatus 10 for preventing data corruption in disk drives from mechanical shock during write operations according to the present invention is depicted in block diagram form. The apparatus and method of the present invention prevents a data head from continuing to write data when mechanical shock to the drive threatens to force it off of the track to which the data is being written.

The preferred apparatus according to the present invention includes a mechanical shock transducer 12 for converting a mechanical shock into an electrical signal. Mechanical shock transducer 12 may preferably be a single-beam or dual-beam cantilever beam rotational accelerometer or other type of accelerometer. Mechanical shock transducer 12 should ideally be mounted in the disk drive in a position and an orientation selected to maximize sensitivity of rotational movement about the actuator pivot point because this axis is the most sensitive to write errors caused by mechanical shock.

The electrical output of mechanical shock transducer 12 drives the input of a signal conditioner 14. Signal conditioner 14 may be a high-input-impedance amplifier device such as an MOS transistor or equivalent. Those of ordinary skill in the art will recognize that an inherent limitation which must be taken into account in the selection of signal conditioner 14 is the need to minimize the time delay between the sensing of the shock and the operation of the apparatus of the present invention. If the delay is too long, the write current to the write head will not be interrupted before the head strays over an adjacent track and irreparably corrupts already written data on that track.

The output of shock-signal conditioner 14 is used as a switching signal input to provide a mechanical-shock-present signal to disk write electronics 16 to interrupt the write current to write head 18. The particular configuration of the switching circuitry employed in disk write electronics 16 to perform this function will depend on the existing circuitry employed in disk write electronics 16. Those of ordinary skill in the art will realize that the switching configuration chosen for use in individual disk drives is a matter of trivial design choice and depends on the particular circuit configuration encountered in disk write electronics 16 for individual disk drives.

In a typical disk drive, a controller 20 normally provides signals to drive a data buffer 22. Data buffer 22 is used to store data obtained from bus 24 to be written to the disk. Bus 24 is usually the internal data bus of the computer containing the disk drive. According to the present invention, the mechanical-shock-present signal from the output of shock-signal conditioner 14 is used by controller 20 to cause it to identify which block of data is being written to the disk at the time the apparatus of the present invention interrupts the current to the write head 18 in response to a mechanical shock.

The mechanical-shock-present signal can be stored in a latch 26 which is interrogated by the controller 20 at the end of writing each block of data. If there has been no shock, the controller will continue normally with its next operation. If a shock has occurred, the latch 26 will be set, and the controller will interrupt its normal routine, will reposition the data head over the original data track, and will rewrite the entire block of data which was being written when interrupted by the shock. Finally latch 26 will be reset. Schemes similar to the latch embodiment described herein will readily suggest themselves to those of ordinary skill in the art.

Both the normal and shock-interrupted controller software routines are designed based on the particular hardware configuration encountered and will be a routine exercise for a skilled programmer. For maximum data integrity, the controller maintains the original data in the data buffer until it is written successfully to the disk without interruption by shock during the write cycle. New data is not lost, since the drive will quit transferring new data into the data buffer until the data already in the data buffer is successfully written. If necessary, the host computer will wait until the drive is ready to accept the new data.

After the shock has ceased, as indicated by the state of the mechanical-shock-present signal from the output of shock-signal conditioner 14, a software routine may be invoked to rewrite the interrupted data. As previously mentioned, the design of such software routines for individual systems will depend on the particular hardware configuration encountered and will be a routine exercise for a skilled programmer.

Figure 2A:
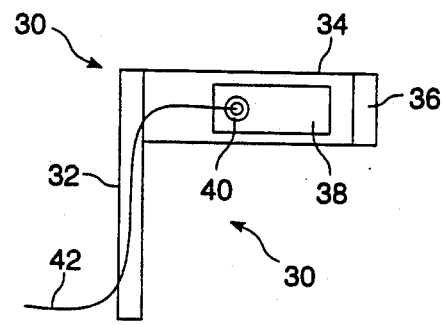
FIG. 2a is a side view diagram of a single-beam cantilever beam rotational accelerometer for shock sensing in the apparatus of the present invention.
Figure 2B:
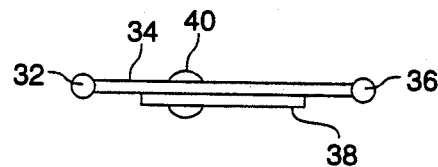

Presently preferred shock sensors according to the present invention are single-beam and dual-beam cantilever-beam rotational accelerometers, such as the ones depicted in FIGS. 2a-2d. Referring first to FIGS. 2a and 2b, an illustrative single-beam cantilever-beam rotational accelerometer 30 comprises a support post 32 or other supporting structure which supports a cantilevered beam 34. A mass 36 is affixed to the distal end of cantilevered beam 34. According to a presently preferred embodiment, cantilever-beam strain gauge 30 may be fabricated from a single piece of sheet metal, such as 0.003 to 0.015" inches thick, and support post 32 and mass 30 may be formed by rolling the ends of the piece of sheet material. Alternatively, support post 32 may be realized by bending a flat end of the sheet metal to create an angled support post member. It is presently contemplated that other resilient materials, such as plastics, stainless steel, and printed circuit board material may also be employed.

As presently contemplated, the length of beam 34 may be between about 0.075" and 0.400" and its height may be about between about 0.50" and 0.150". Mass 36 is selected for proper shock sensitivity threshold, and, in a presently preferred embodiment, should have a mass of between about 0.01 gm and 1.0 gm.

Sensor 38, preferably comprising a piezoelectric film, such as available under the trademark Kynar from Atochem Sensors, Inc., of Valley Forge, Pa., or the available under the trademark Solef from Solvay Technologies, Inc., of New York, N.Y., is fixedly mounted on the face of beam 34. Sensor 38 includes first and second electrical connections, preferably comprising eyelet 40 connecting to wire 42. A conductive trace disposed on the back side of the film 42 makes an electrical connection to beam 34. The output signal of sensor 38 may be obtained between post 32 and wire lead 40. A typical output signal from sensor 38 is between about 0.1 mV to 1 V. Sensors of the type useful in the present invention are disclosed in the article D. Maliniak, Piezoelectric- Film Sensors Leave Niches Behind, Electronic Design, Vol. 39, No. 23, Dec. 5, 1991.

Figure 2C:
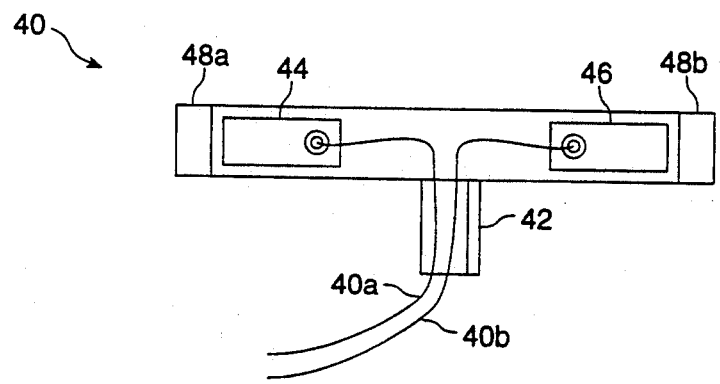
FIG. 2c is a side view diagram of a dual-beam cantilever beam rotational accelerometer, presently preferred for shock sensing in the apparatus of the present invention.
Figure 2D:
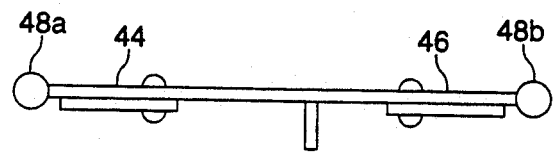
FIG. 2d is a top view diagram of the dual-beam cantilever beam rotational accelerometer of FIG. 2c.

Referring now to FIGS. 2c and 2d, an illustrative dual-beam cantilever-beam rotational accelerometer 40 useful in the present invention comprises a support post 42 which supports two cantilevered beams 44 and 46. In a presently preferred embodiment, cantilevered beams 44 and 46 may be oriented 180° with respect to one another, but other orientations may be possible for other particular sensing needs.

A mass 48a is affixed to the distal end of cantilevered beam 44 and a mass 48b is affixed to the distal end of cantilevered beam 46. The materials and construction of dual-beam cantilevered rotational accelerometer 40 may be the same as described for single-beam cantilevered rotational accelerometer 30, the only difference being the presence of the additional cantilevered beam.

Alternatively, other mechanical shock sensing means may be employed in the present invention. For example, it may be possible to employ an accelerometer, such as part No. ADXL50, manufactured by Analog Devices Corporation of Norwood Mass. This part is designed to sense collisions, or decelerations up to +50 or −50 g's, in the forward or reverse direction (i.e., along one axis), and has a bandwidth of 1,000 Hz—which is good enough for the air bag application, but, as presently configured, is to slow for the disk drive application. Several approaches may be taken to speed up the response time. It may be possible to increase the bandwidth to 2,000 Hz and above. In conjunction with this, either the intelligence of the microprocessor in the disk drive may be employed to monitor how fast the output of the ADXL50 is changing, or analog signal processing may be employed to perform the equivalent operation, and detect the severe shocks of concern faster. It may also be possible to speed up the ADXL50 accelerometer response time by modifying its closed-loop design to an open-loop design.

According to a presently preferred embodiment of the invention, the mechanical shock sensor is positioned in the disk drive so as to maximize sensitivity to rotation about the axis of the voice coil actuator because this axis is the most sensitive to write errors caused by mechanical shock.

In the ideal orientation, which is with the beam located on the axis of the head rotation and oriented approximately parallel to the head arms, the sensor has maximum sensitivity to rotation with reduced sensitivity in the x and y directions (front-to-back and side-to-side) and almost no sensitivity in the z (top-to-bottom) direction. If the sensor is slightly reoriented by tilting it off the vertical direction, it can be made sensitive in the z direction also. Since the drive is most sensitive to rotational movements, and has very reduced sensitivities in the x, y, and z directions, the sensor sensitivities can be tailored to match the shock vulnerabilities of the drive by varying the orientation of the sensor. The dual beam accelerometer has additional flexibility in matching the shock sensitivities of the drive in the x, y, z, and rotational directions, by summing the individually weighted outputs of the two beams differentially combined with tilting the beam. Alternatively, if necessary for space saving or other reasons, mechanical shock transducer 12 may be mounted elsewhere in the drive and its output calibrated to take into account the differences between its actual position and orientation and its ideal position and orientation on the measured force of mechanical shock to the disk drive.

Figure 3:
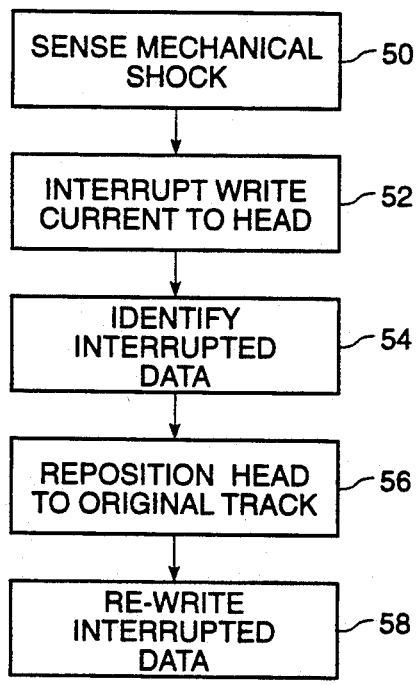
FIG. 3 is a flow diagram illustrating the steps of a method for preventing data corruption in disk drives from mechanical shock during write operations according to a presently preferred embodiment of the invention.

Referring now to FIG. 3, a presently preferred method according to the invention for preventing data corruption in disk drives from mechanical shock during write operations is illustrated in flow diagram form. The steps of the method according to this aspect of the invention may be carried out using the apparatus disclosed herein or by employing other apparatus, the details of which will be apparent to those of ordinary skill in the art from a study of this disclosure.

According to the preferred method of the invention, a mechanical shock having a magnitude exceeding a predetermined threshold is first sensed by employing a suitable transducer. This is illustrated at step 50 in FIG. 3.

When a mechanical shock exceeding the threshold is detected, the write current to the write head is interrupted immediately. This step, illustrated at block 52, prevents data from being miswritten by the head as the shock causes it to stray over a track adjacent to the track for which it was intended.

After sensing the shock in the first step of the method according to the present invention, information identifying the data being written at the onset of the sensed shock is available to permit rewriting of the data after the shock has passed. This step, illustrated in block 54, may be carried out in a variety of ways, depending on the write-control electronics and write buffer structure contained in the system in which the present invention is to be employed. For example, as presently preferred, latch 26 (FIG. 1) is set when the shock is sensed. Latch 26 is read by the controller each time it finishes writing a block of data. If the latch 26 is not set, the controller merely directs that the buffer be filled with the next record to be written, and then proceeds to write the new data. If, however, the latch 26 has been set, the controller knows that the write process has been interrupted by the apparatus of the present invention. The data head is repositioned to the original track as shown in block 56 and the data already in the buffer is rewritten. Latch 26 is then reset.

This process step may be easily implemented by a software routine which simply adds the step of interrogating the latch after each write cycle, and branching to a rewrite routine if the latch 26 is set. The latch 26 may then be reset by the controller after the rewrite operation has been completed. Particular code to be used with such a software routine is dependent on the hardware used and may be easily created by persons of ordinary skill in the art.

After the mechanical shock has passed, the data which was interrupted because of the sensed shock is rewritten, as illustrated in block 58. This step may be performed by rewriting the entire block of data which was in the data buffer at the time the shock was sensed. This step includes the step of re-enabling the write current to the write head and clearing the shock-sensing latch 26, as previously mentioned.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. Apparatus for preventing data corruption on a disk of a disk drive due to a mechanical shock experienced by said disk drive while writing data to a selected data track on said disk by passing a write-current to a write head disposed on a head arm of an actuator, said apparatus comprising:

mechanical shock sensing means for sensing mechanical shock having a magnitude exceeding a predetermined threshold and producing a shock-present signal in response thereto, said mechanical shock sensing means including a beam having a first end, a second end and a piezoelectric film strain sensor attached along a length of said beam, said second end having a mass of between 0.01 gm and 1.0 gm attached thereto, an electrical output of said piezoelectric film strain sensor carried on a pair of conductors;

write-disable means, responsive to said shock-present signal, for interrupting the write current to the write head;

interrupted-data identifying means, responsive to said shock-present signal, for identifying interrupted data being written at the time said shock-present signal indicates the presence of the mechanical shock; and recovery means, responsive to said interrupted-data identifying means, for repositioning the write head over the selected track and for rewriting said interrupted data.

2. The apparatus of claim 1 wherein said first end of said mechanical shock sensing means is fixed along a mounting axis parallel to an axis of rotation of the actuator so as to permit rotational movement of said beam about said mounting axis in response to a shock applied to the disk drive about said axis of rotation.

3. The apparatus of claim 2 wherein said mechanical shock sensing means comprises an accelerometer.

4. The apparatus of claim 3 wherein said mechanical shock sensing means comprises a cantilever-beam accelerometer.

5. The apparatus of claim 3 wherein said mechanical shock sensing means comprises a single-beam cantilever-beam accelerometer.

6. The apparatus of claim 3 wherein said mechanical shock sensing means comprises a dual-beam cantilever-beam accelerometer having a beam positioned on an axis of rotation of the head arm.

7. A method for preventing data corruption on a disk of a disk drive caused by mechanical shock experienced by said disk drive while writing data to an original data track with a data head, said method including the steps of:

sensing a mechanical shock having a magnitude exceeding a predetermined threshold with a mechanical shock sensor including a beam having a first end, a second end and a piezoelectric film strain sensor attached along a length of said beam, said second end having a mass of between 0.01 gm and 1.0 gm attached thereto, an electrical output of said piezoelectric film strain sensor carried on a pair of conductors;

interrupting the write current to the data head of said disk drive during said mechanical shock;

storing information identifying interrupted data being written when said write-current is interrupted;

repositioning the data head to the original data track; and rewriting said interrupted data.

8. A method for preventing data corruption on a disk of a disk drive caused by a mechanical shock experienced by said disk drive while writing data to a data track with a data head, said method including the steps of:

temporarily storing in a buffer a block of data to be written to the disk;

initiating a disk-write operation;

temporarily storing a shock indicator signal in a selected storage location if a mechanical shock having a magnitude exceeding a predetermined threshold is sensed, said shock indicator signal derived from a mechanical shock sensor including a beam having a first end, a second end and a piezoelectric film strain sensor attached along a length of said beam, said second end having a mass of between 0.01 gm and 1.0 gm attached thereto, an electrical output of said piezoelectric film strain sensor carried on a pair of conductors;

interrupting the write current to the data head if said mechanical shock is sensed;

examining said selected storage location for said shock indicator signal after completion of said disk-write operation; and repositioning the data head to the data track and rewriting said block of data if said shock indicator signal is present.

9. A disk drive memory storage unit comprising:

at least one disk surface capable of being rotated about a first axis;

a voice coil actuator capable of rotary motion about a second axis parallel to said first axis;

a head arm mounted on said voice coil actuator;

a write head mounted on said head arm and positioned over said disk surface by said voice coil actuator;

said write head adapted to write information to a track of said disk surface in response to a write-current passed through said write head;

mechanical shock sensing means for sensing a mechanical shock having a magnitude exceeding a predetermined threshold and producing a shock-present signal in response thereto, said mechanical shock sensing means including a beam having a first end, a second end and a piezoelectric film strain sensor attached along a length of said beam, said second end having a mass of between 0.01 gm and 1.0 gm attached thereto, an electrical output of said piezoelectric film strain sensor carried on a pair of conductors;

write disable means, responsive to said shock-present signal, for interrupting said write-current to said write head;

interrupted-data identifying means, responsive to said shock-present signal, for identifying interrupted data being written at the time said shock-present signal indicates the presence of a mechanical shock exceeding said predetermined threshold; and recovery means for repositioning said write head over said track and rewriting said interrupted data if said shock-present signal indicates the presence of a mechanical shock exceeding said predetermined threshold.

10. A disk drive memory storage unit according to claim 9 wherein said first end of said beam is mounted along a third axis parallel to said first axis so as to permit rotational movement of said beam about said third axis in response to a shock applied to the disk drive about said first axis.

* * * * *